Feb. 9, 1926.

H. MISCAMPBELL 1,572,156

LIME KILN

Filed Feb. 16, 1925

Inventor

HUGH MISCAMPBELL.

By Geo. Stevens.

Attorney

Patented Feb. 9, 1926.

1,572,156

UNITED STATES PATENT OFFICE.

HUGH MISCAMPBELL, OF DULUTH, MINNESOTA.

LIMEKILN.

Application filed February 16, 1925. Serial No. 9,400.

*To all whom it may concern:*

Be it known that I, HUGH MISCAMPBELL, a citizen of the United States, residing at Duluth, in the county of St. Louis and State of Minnesota, have invented certain new and useful Improvements in Limekilns, of which the following is a specification, reference being had therein to the accompanying drawing.

This invention relates to lime kilns and has special reference to a novel form of construction thereof.

The principal object of the invention is to provide a more practical and efficient kiln than heretofore known, and one simple of construction.

Other objects and advantages of the invention will appear in the further description thereof.

Referring now to the accompanying drawing, forming part of this application, and in which like reference characters indicate like parts:

1 represents the stack or body portion of the kiln which is preferably cylindrically shaped externally and is lined with fire brick, concrete, or the like, as desired, forming the peculiarly shaped retort chamber 2. The upper portion 3 of the chamber is of inverted frustroconical shape forming the feeding hopper which terminates into a pronouncedly expanded cylindrical portion 4, said enlargement being somewhat abrupt, though formed of easy curved lines, there being no straight walled neck existing between the two portions wherein material might become clogged in its descent. Below this arcuately shaped throat which in the art is known as a choke, I prefer to shape the chamber 2 with two opposed walls parallel throughout, these being the walls in alinement with the slack arches, while the two diametrically opposite walls diverge to a point just above the slack arches, and which point is indicated at 5, the arches being shown at 6.

By this means the product within the kiln is given slightly more room, as it descends in one direction only and there is no contraction in the opposite direction, the chamber is freed from any liability of clogging or bridging.

This I consider a novel and advantageous feature as in some kilns the walls opposite to those which diverge are made to converge with, it is thought, less advantageous results.

Figures 1, 2:
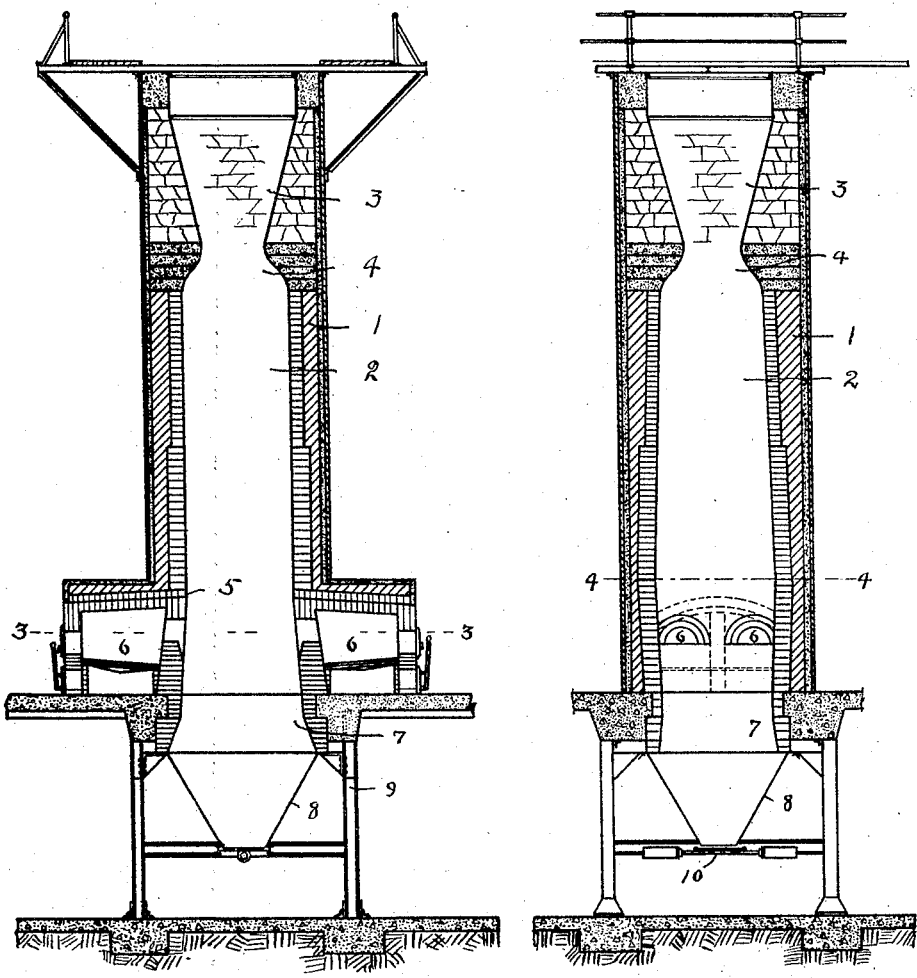
Figure 1 is a vertical section, partly in elevation, of one of the improved kilns, taken longitudinally of the accompanying furnaces or slack arches.
Figure 2 is a similar view taken at right angles to Figure 1.
Figure 3:
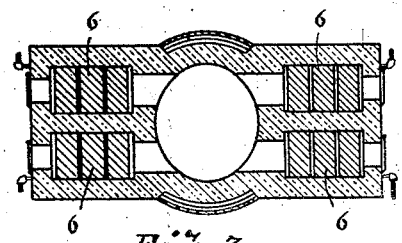
Figure 3 is a horizontal section on the line 3—3 Figure 1.
Figure 4:
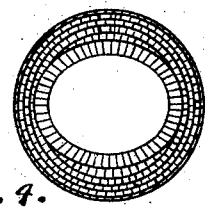
Figure 4 is a transverse section on the line 4—4 Figure 2.

Intermediate of the slack arches and from the point indicated at 5 downwardly, the shaping of the walls of the chamber 2 change slightly in that the walls which were parallel above diverge, and those which were farther apart at the point 5 and above same converge, as clearly shown in Figures 1 and 2, resulting in the elliptical form shown in Figure 3.

This change of the contour of the walls in the chamber occurs at a single point therein, thus again avoiding the disadvantage of any straight necked portion as is common to such kilns.

Below a lever with the bottom of the arches the retort flares outwardly as at 7 and terminates in the conically shaped discharge hopper 8 mounted within the fabricated steel foundation structure 9, and the discharge orifice of this hopper is controlled in any desired manner, preferably by steam or air operated doors indicated at 10 spaced above the ultimate floor of the kiln so that transporting vehicles may be conveniently passed thereunder.

As a support for the kiln proper and its slacking arches I prefer to form the concrete construction 11, the same being reinforced as desired.

From the foregoing it is evident that I have devised an exceedingly simple form of lime kiln in which there are no continuously uniform areas thus overcoming to a large extent many of the difficulties experienced in the operation of lime kilns.

Having thus described my invention, what I claim and desire to secure by Letters Patent, is:

A lime kiln comprising a vertically elongated chamber and a port in the lower portion thereof for injecting heating gas thereinto, said chamber comprising two opposed parallel vertical walls and two diametrically opposite walls diverging downwardly and on the same level as said vertical walls for the purpose described.

In testimony whereof I hereunto affix my signature.

HUGH MISCAMPBELL.